United States Patent
Cromer

(10) Patent No.: US 11,589,518 B2
(45) Date of Patent: Feb. 28, 2023

(54) LIGHT DIFFUSER FOR HORTICULTURAL LIGHTING

(71) Applicant: Arkema France, Colombes (FR)

(72) Inventor: Brian Cromer, Royersford, PA (US)

(73) Assignee: Trinseo Europe GmbH, Pfaeffikon (CH)

( * ) Notice: Subject to any disclaimer, the term of this patent is extended or adjusted under 35 U.S.C. 154(b) by 0 days.

(21) Appl. No.: 17/285,520

(22) PCT Filed: Oct. 17, 2019

(86) PCT No.: PCT/US2019/056688
§ 371 (c)(1),
(2) Date: Apr. 15, 2021

(87) PCT Pub. No.: WO2020/081780
PCT Pub. Date: Apr. 23, 2020

(65) Prior Publication Data
US 2021/0386023 A1    Dec. 16, 2021

Related U.S. Application Data

(60) Provisional application No. 62/747,242, filed on Oct. 18, 2018.

(51) Int. Cl.
| | | |
|---|---|---|
| *A01G 7/04* | (2006.01) | |
| *F21V 3/06* | (2018.01) | |
| *C08L 33/12* | (2006.01) | |
| *F21Y 115/10* | (2016.01) | |

(52) U.S. Cl.
CPC .............. *A01G 7/045* (2013.01); *C08L 33/12* (2013.01); *F21V 3/0625* (2018.02); *C08L 2203/20* (2013.01); *F21Y 2115/10* (2016.08)

(58) Field of Classification Search
CPC . A01G 7/045; A01G 7/04; A01G 7/00; A01G 9/249; F21V 3/0625; F21V 3/062; F21V 9/00; C08L 33/12; C08L 2203/20; C08L 33/10; C08L 2205/22; F21Y 2115/10; C08K 5/005
See application file for complete search history.

(56) References Cited

U.S. PATENT DOCUMENTS

| | | | |
|---|---|---|---|
| 6,297,906 B1 * | 10/2001 | Allen ................... | G02B 5/3008 252/585 |
| 7,407,998 B2 | 8/2008 | Yang et al. | |
| 7,547,736 B2 | 6/2009 | Yang et al. | |
| 8,163,827 B2 * | 4/2012 | Garcia-Leiner .......... | C08K 3/26 524/436 |
| 8,398,264 B2 | 3/2013 | Anderson et al. | |
| 9,439,989 B2 | 9/2016 | Lalicki et al. | |
| 9,927,097 B2 | 3/2018 | Lalicki et al. | |
| 2007/0221865 A1 * | 9/2007 | Sohn ................... | C09K 11/7761 250/483.1 |
| 2008/0242786 A1 * | 10/2008 | Garcia-Leiner .......... | C08K 3/26 524/436 |
| 2008/0245411 A1 * | 10/2008 | Hammermann .......... | C09B 5/62 136/256 |
| 2015/0287891 A1 | 10/2015 | Liu et al. | |
| 2016/0095282 A1 * | 4/2016 | Devisme ................. | B32B 27/08 524/506 |
| 2016/0333634 A1 * | 11/2016 | Free ........................ | B32B 17/10 |
| 2018/0117190 A1 | 5/2018 | Bailey | |
| 2018/0216789 A1 * | 8/2018 | May ....................... | H01R 33/94 |
| 2019/0125905 A1 | 5/2019 | Weeks, Jr. et al. | |

FOREIGN PATENT DOCUMENTS

| | | |
|---|---|---|
| EP | 0342283 A1 | 11/1989 |
| EP | 1939231 A1 | 7/2008 |
| EP | 1950244 A1 | 7/2008 |
| JP | 5940614 B2 | 6/2016 |
| JP | 55940614 B2 | 6/2016 |

OTHER PUBLICATIONS

International Search Report and Written Opinion for International Application No. PCT/US19/56688, dated Jan. 2, 2020, 11 pages.
Suthaparan, A., Solhaug, K. A., Bjugstad, N., Gislerød, H. R., Gadoury, D. M., Stensvand, A. 2016. Suppression of powdery mildews by Uv-B: application frequency and timing, dose, reflectance, and automation. Plant Dis. 100:1643-1650.
Masaya Tanaka, Junya Yase, Shinichi Aoki, Takafumi Sakurai, Takeshi Kanto, Masahiro Osakabe, "Physical Control of Spider Mites Using Ultraviolet-B With Light Reflection Sheets in Greenhouse Strawberries", Journal of Economic Entomology, vol. 109, Issue 4, Aug. 1, 2016, pp. 1758-1765.
Supplementary European Search Report for European Application No. 19 872 715.8, dated Jul. 12, 2022, 10 pages.

* cited by examiner

Primary Examiner — Bao Q Truong
(74) Attorney, Agent, or Firm — RatnerPrestia

(57) ABSTRACT

The invention relates to a light-diffusing material, having a high transmission of UVA light, useful for horticultural lighting. The light-diffusing material has a hiding power of greater than 50% at 350 nm and a transmission of light at 350 nm of at least 30 percent, and preferably at least 50%. Additionally the light-diffusing material also transmits and diffuses at least 50% of light at 300 nm, 465 nm, and at 800 nm. The light-diffusing material is especially useful as a glazing for horticultural use.

17 Claims, No Drawings

LIGHT DIFFUSER FOR HORTICULTURAL LIGHTING

This application claims benefit, under U.S.C. § 119 or § 365 of PCT Application Number PCT/US2019/056688, filed Oct. 17, 2019; and U.S. Provisional Application No. 62/747,242 filed Oct. 18, 2018; said applications incorporated herein by reference.

FIELD OF THE INVENTION

The invention relates to a light-diffusing material, having a high transmission of UVA light, useful for horticultural lighting. The light-diffusing material has a hiding power of greater than 50% at 300 nm and a transmission of light at 300 nm of at least 30 percent, and preferably at least 50%. Additionally the light-diffusing material also transmits and diffuses at least 50% of light at 300 nm, 465 nm, and at 800 nm. The light-diffusing material is especially useful as a glazing for horticultural use.

BACKGROUND OF THE INVENTION

In order to satisfy the world's increasing need for food, new farming methods are being developed. One such method that preserves space, is vertical farming.

Vertical farming is a new crop growing strategy that uses artificial LED horticultural light to grow crops indoors (or provide supplemental LED light to greenhouse or outdoor crops), requiring far less space, water, and nutrients than conventional farming. Accordingly, vertical farming it is an ideal solution to achieving food production capacity in densely populated urban areas, and/or where arable land is sparse. However plant biologists are now discovering that direct LED light is not ideal for maximizing crop efficiency. Many plants perform better in diffused light, and research has shown that diffused light increases the yield of some plants, and changes the antioxidant profile in tomatoes. (Annls of Botany 114:145-156, 2014, and J. Sci. Food Agric 2018: 98: 44427-4435).

It is known to those skilled in the art that different segments of sunlight's spectral emission have different effects on crop growth. For example:

Blue and Red light: Key absorbance of Chlorophyll, essential for crop metabolism Ultraviolet-A light: Production of plant flavonoids and phenyl propanoids. Additionally, UVA light increases food safety by destroying some fungi and microbacteria on the surface of food.

Far red light promotes stem elongation in plants of fuchsia hybrid

Ultraviolet B light has been shown to suppress plant diseases or pests such as mildew and spider mites (Plant Dis. 100:1643-1650, J Econ Entomol. 109(4): 1758-65)

Polymer particles are used in a polymer matrix to manage light diffusion. For example, U.S. Pat. No. 7,547,736 describes the use of particles having an average particle size of 15 to 70 microns to provide a frosted look and textured surface, and U.S. Pat. No. 8,163,827 describes a high light transmission diffusion screen having inorganic pigments and refractive index-matched particles. US 2015/0267891 describes a diffusing cover having diffusing particles of at least 2 different average particles sizes.

There are currently several commercial acrylic light diffusion materials, comprising spherical plastic particles dispersed within an acrylic matrix. Nearly all commercial acrylic/PMMA products contain additives that block UV light (200-400 nm) in order to increase safety for human exposure, the intended application of current commercial acrylic light diffusion materials. Products exist without UVA blockers, but these products are neither meant for use with LED light, nor contain diffusing particles, such as PMMA sheet for tanning beds (U.S. Pat. No. 7,407,998).

There is a need for a diffusing glazing material that will transmit high levels of UV-A light (350 nm), UV-B light (300 nm) and well as high levels of visible and IR light needed by plants for proper development. The diffusing glazing must also diffuse the light in the same (300 to 1000 nm) spectra, as diffuse light is more efficiently used by crops because it penetrates the crop canopy more efficiently than direct LED light or sunlight.

SUMMARY OF THE INVENTION

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. A diffusing composition comprising a transparent or translucent polymer matrix, wherein said diffusing composition transmits at least 30 percent, preferably at least 40 percent, more preferably at least 50 percent, more preferably at least 60 percent, more preferably at least 70 percent and most preferably at least 80 percent of UVB light at 300 nm as well as at least the same percentage of light at each of 350 nm (UVA), 465 nm, 665 nm sand 800 nm, and wherein said composition is a diffusing composition, having a level of diffusion, as measured by hiding power, of at least 25 percent, preferably at least 50 percent, preferably at least 60 percent, more preferably at least 70 percent, and more preferably at least 80 percent.
2. The composition of aspect 1, wherein said composition is in the form of a glazing sheet or a glazing film.
3. The composition of aspects 1 or 2, wherein said polymer matrix is a thermoplastic, selected from the group consisting of polycarbonate (PC), polyethylene terephthalate, glycol modified (PETG), polyvinyl chloride (PVC), impact modified PVC, polyesters (PET, PBT, APET, etc.), styrene acrylonitrile (SAN), acrylonitrile-acrylate copolymer, acrylonitrile-methyl methacrylate copolymer, methyl methacrylate-styrene copolymer, methacrylate-butadiene-styrene terpolymer, acrylonitrile-styrene-acrylate (ASA) terpolymer, acrylonitrile butadiene styrene (ABS) terpolymer, polystyrene (PS), high impact polystyrene (HIPS), polyolefins, impact modified polyolefins, polycyclo-hexylethylene, cyclic olefin copolymer (COC), polyvinylidene fluoride (PVdF), PVdF-acrylic copolymers, imidized acrylic polymer, acrylic polymers, impact modified acrylic polymers, and mixtures thereof.
4. The composition of any of aspects 1-3, wherein said polymer matrix is a polymethylmethacrylate (PMMA) homopolymer, or a PMMA copolymer comprising at least 50 weight percent of methyl methacrylate monomer units.
5. The composition of any of aspects 1-4, wherein said composition further comprises impact modifiers and UVB and/or UVC absorbers.

6. The composition of any of aspects 1-5, further comprising from 0.1 to 40 weight percent of diffusing particles dispersed in said polymer matrix, preferably from 0.2 to 30 weight percent.

7. The composition of any of aspects 1-6, wherein said diffusing particles are organic, inorganic, or a mixture thereof.

8. The composition of any of aspects 1-7, wherein said dispersing particles are inorganic, organic or a mixture thereof; have a spherical, near spherical or irregular shape, and have a refractive index mis-match with the polymer matrix of +/−0.01 to 0.25

9. The composition of any of aspects 1-8, wherein said diffusing particles have an average particle size of from 500 nm to 120 micrometers.

10. The composition of any of aspects 1-9, wherein said dispersing particles comprise at least two different populations of number average particle sizes.

11. The composition of any of aspects 1-10, wherein said impact modifiers have a core/shell morphology, where the core comprises a polysiloxane.

12. A unit for horticultural production comprising at least one sheet of the diffusing composition of aspect 1 and at least one LED light engine, wherein said diffusing sheet or film is positioned between the LED light engine and at least one plant.

13. The unit for horticultural production of aspect 12, comprising at least one sheet of the diffusing composition of aspects 1-11 and at least one LED light engine, wherein said diffusing sheet has a hiding power of ±30 across the spectrum 300 nm-1000 nm.

14. The unit for horticultural production of aspects 12 and 13, where said diffusion is caused by a multi-modal distribution of diffusion particle sizes, a textured surface, or both.

15. A coated diffusing glazing, wherein said glazing comprises a sheet or film comprising the composition of aspect 1, and wherein said sheet or film is further comprises a coating layer on at least one side.

16. The coated diffusing layer of aspect 15, wherein said coating layer is a coating or a film layer.

17. The coated diffusing layer of aspects 15 or 16 wherein said coating layer is a diffusing layer.

16. The coated diffusing layer of any of aspects 13 to 15, wherein said coating layer is a dirt-shedding or weather resistant layer.

DETAILED DESCRIPTION OF THE INVENTION

The invention relates to a polymer glazing capable of both transmitting and diffusing high levels of light over a broad spectrum of 300-1000 nm. The glazing preferably contains diffusing particles, preferably of either multiple average particle sizes, or an extremely broad distribution of particle sizes, in a light transmitting polymer matrix.

All references cited herein are incorporated by reference. Unless otherwise stated, all molecular weights are weight average molecular weights as determined by Gas Permeation Chromatography (GPC), and all percentages are percentage by weight.

The term "copolymer" as used herein indicates a polymer composed of two or more different monomer units, including two comonomers, terpolymers, and polymers having 3 or more different monomers. The copolymers may be random or block, may be heterogeneous or homogeneous, and may be synthesized by a batch, semi-batch or continuous process.

As used herein, "Point light source" means any shaped source of electromagnetic radiation in the 4,000-7,700 Angstrom range. This includes, but is not limited to, incandescent, fluorescent, neon, argon and LED light sources.

Matrix:

The glazing matrix polymer is a thermoplastic or thermosetting polymeric material, having a light transmission in the range of from 300 to 1000 nm of at least 50%, preferably at least 70% and even more preferably at least 80% according to the DIN 67-507 standard (this is the light transmission of the polymer with no scattering particle). The matrix may be transparent or translucent. A translucent glazing can help with light scattering, and so is preferred. The translucency can be caused by a physical treatment of the glazing surface, or by the addition of particles, and in particular of particles with a mis-match of refractive index of from 0.01 to 0.3, and more preferably from 0.02 to 0.25, plus or minus.

Useful polymer matrix materials include, but are not limited to, polycarbonate (PC), polyethylene terephthalate, glycol modified (PETG), polyvinyl chloride (PVC), impact modified PVC, polyesters (PET, PBT, APET, etc.), styrene acrylonitrile (SAN), acrylonitrile-acrylate copolymer, acrylonitrile-methyl methacrylate copolymer, methyl methacrylate-styrene copolymer, methacrylate-butadiene-styrene terpolymer, acrylonitrile-styrene-acrylate (ASA) terpolymer, acrylonitrile butadiene styrene (ABS) terpolymer, polystyrene (PS), high impact polystyrene (HIPS), polyolefins, impact modified polyolefins, polycyclo-hexylethylene, cyclic olefin copolymer (COC), polyvinylidene fluoride (PVdF), PVdF-acrylic copolymers, imidized acrylic polymer, acrylic polymers, impact modified acrylic polymers, etc., or mixtures thereof.

Acrylics, polystyrene, styrene acrylonitrile and polycarbonate are the preferred polymer matrices due to their ease of processing, and commercial availability In addition, these polymers exhibit excellent thermomechanical strength. While the energy efficiency of an LED is much better than for an incandescent lamp, some of the energy is nevertheless converted into heat.

Acrylic polymers, as used herein, are meant to include polymers, and copolymers having two or more different monomer units that are formed from alkyl methacrylate and alkyl acrylate monomers, and mixtures thereof. The alkyl methacrylate monomer is preferably methyl methacrylate, which may make up from greater than 50 to 100 percent of the monomer mixture. 0 to less than 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer mixture. Most preferably the acrylic polymer is a copolymer having 70-99.5 weight percent and more preferably 80 to 99 percent of methyl methacrylate units and from 0.5 to 30 weight percent of one or more $C_{1-8}$ straight or branched alkyl acrylate units.

The acrylic polymer can be an alloy with one or more compatible polymers. Preferred alloys are PMMA/polyvinylidene fluoride (PVDF) alloys, and PMMA/polylactic acid (PLA) alloys The alloy contains 2 to 95 weight percent, preferably 5 to 90 weight percent, more preferably 20-90, and more preferably 51-90 weight percent of the PMMA homopolymer or copolymer, and 5 to 98 weight percent, preferably 10 to 95 weight percent, more preferably 10 to 80 weight, and more preferably 10 to 49 percent of the compatible polymer.

The polymer matrix may contain additives, including impact modifiers, and other additives typically present in polymer formulations, including but not limited to, stabilizers, plasticizers, fillers, coloring agents, pigments, dyes, antioxidants, antistatic agents, surfactants, toner, refractive index matching additives, additives with specific light diffraction.

Preferably, UVB or UVC additives are added to help prevent degradation of the composition upon exposure to UVB radiation. Useful light absorbers that absorb UVB and UVC light (200-320 nm light) include hindered amine light stabilizers (e.g. Tinuvin 770) and phenolic aldehydes (e.g. Methyl Salicylate or N-(2-Ethoxyphenyl)-N'-(2-ethylphenyl)oxamide).

The matrix preferably contains no UVA blocking additives, as it is important to allow the majority of UVA radiation through the glazing.

Useful impact modifiers include block copolymers, graft copolymers, and core/shell impact modifiers. The impact modifier may be present at a level of from 0 to 80 weight percent, preferably 5 to 45, and more preferably from 10 to 30 weight percent, based on the total layer of matrix polymer and all additives. The level of impact modifier can be adjusted to meet the toughness needs for the end use of the composition. Core-shell impact modifiers are multi-stage, sequentially-produced polymer having a core/shell particle structure of at least two layers. Preferentially, the core-shell modifier comprises three layers made of a hard core layer, one or more intermediate elastomeric layers, and a hard shell layer.

In one embodiment, the impact modifier comprises a core made of acrylate/polysiloxane copolymer and a shell made of hard resin. In this case, the core is a material of flexible rubber type prepared by polymerization of one or more vinyl monomers in the presence of a polymer of rubber type obtained from monomers such as alkyl acrylates or alkyl methacrylates, in which the alkyl group comprises from 2 to 10 carbon atoms. Products of this type are sold by Mitsubishi Rayon under the reference Metablen® S-2001.

According to another embodiment, the impact modifier is composed of a poly(organosiloxane) core and of a shell of thermoplastic resin. The organic groups of the poly(organosiloxane) cores are preferably alkyl or vinyl radicals comprising between 1 and 18 carbons, advantageously between 1 and 6 carbons, or aryl radicals or hydrocarbons which are substituted. The poly(organosiloxane) comprises one or more of these groups. The siloxanes have a variable degree of functionalization which defines the degree of crosslinking of the poly(organosiloxane). Preferably, the mean degree of functionalization is between 2 and 3, thus forming a partially crosslinked core. The shell is formed of polymers or copolymers resulting from monomers such as alkyl acrylates or methacrylates, acrylonitrile, styrene, vinylstyrene, vinyl propionate, maleimide, vinyl chloride, ethylene, butadiene, isoprene and chloroprene. The fraction of the core represents between 0.05 and 90% by weight of the particles, preferably between 60 and 80% by weight. The size of the particles is between 10 and 400 nm. Mention may be made, as example of impact modifier of this type, of the products of the Genioperl® range from Wacker Silicones.

Diffusion

Glazing of the invention, in addition to having a high transmission, also has a high level of diffusion. The diffusion of the material glazing of the invention, as measured by hiding power, is at least 25 percent, preferably at least 50 percent, preferably at least 60 percent, more preferably at least 70 percent, and more preferably at least 80 percent, at each of 350 nm, 465 nm, 665 nm, and 800 nm. The diffusion may be due to the presence of diffusing particles in the matrix, the texturing of the glazing surface, the protrusion of hard particles from the surface of the glazing, or a combination thereof.

In one preferred embodiment, the diffusion over the whole spectrum of 300 nm-1000 nm has a hiding power of +/−30 and preferably +/−15.

Surface texture, or roughness, may be obtained in several ways. In the case of a cast sheet, the glass mold, which forms the sheet, may have a surface roughness that has been obtained by treating the glass of the mold, for example with hydrofluoric acid. Sandblasting may be used. Plasma or other surface treating methods may be used, as known in the art. A textured roller may be used with extruded sheet. The particles in the composition can also produce surface roughness, as the particles partially protrude from the surface—especially as the thermoplastic matrix cools and recedes. Particles having a mean particle size of from 30 to 150 microns and preferably 40 to 100 microns can produce a desired surface roughness. The surface roughness, denoted by Ra, is expressed in microns and can be measured using a roughness meter (for example of the Talysurf Surtronic 3P brand from Rank-Taylor-Hobson) according to the ISO 4287 and ISO 4288 standards. A surface roughness of between 0.5 and 4 μm, preferably between 1 and 3 μm on at least one of the faces of the glazing allows the light-scattering effect of the diffusing particles to be enhanced. Surface roughness also reduces the visual effect of scratching and marring.

In one embodiment, a diffusing layer may be added on top of the diffusing glazing to further enhance diffusion of the glazing.

The diffusing particles of the invention, if present, are present at from 0.1 to 40 weight percent, based on the weight of the total glazing, preferably from 0.2 to 30 percent, and more preferably from 0.3 to 20 percent. The level of total diffusing particles can depend on the average particle size, and also on the thickness of the glazing. The particles preferably do not adsorb 350-400 nm light, and preferably not 300-400 nm light.

The particles have a refractive index that is mismatched to the matrix, having a refractive index that is 0.01 to 0.25 different than that of the matrix polymer, preferably from 0.02 to 0.20. Index of refraction can be measured by methods well known in the art such as in conformance with ASTM D 542. Since different sized particles diffuse light most efficiently at specific wavelengths, in order to provide good diffusing over the range from 300 nm to 1000 nm of light two or more different average particle size distributions are preferably used—or else a single average particle size with a very, very wide distribution of particle. Smaller size diffusing particle are better at diffusing lower wavelength light, and larger average particle size particles are better at diffusing longer wavelength light.

The diffusing particles may be organic, inorganic or a mixture thereof, and may be spherical, near-spherical, or irregular shaped—or mixtures thereof. The particles have an average particle size generally in the range of 500 nm to 120 micrometers. A blend of low, 1 to 20 micron average particles size particles, medium 20 to 50 micrometers average particle size particles, and large 50 to 120 micrometer average particle size particles, for example, would provide good diffusing properties over the 300 nm to 1000 nm wavelength range.

Examples of useful particles include inorganic particles such as $BaSO_4$, $TiO_2$, $CaCO_3$; fluoropolymer particles such as poly(tetrafluoroethylene) (PTFE), poly(chlorotrifluoroethylene) (PCTFE), poly(vinylidene fluoride) (PVDF), ethylene chlorotrifluoroethylene (ECTFE), and copolymers thereof; hydrophobic polymers such as polyalkyl oxides; polystyrene; core/shell polymer particles; cross-linked acrylic beads, preferably made by a suspension process having a composition of 0-99.99% styrene, 0-99.99% alkyl methacrylate or alkyl acrylate, or a mixture of both, and 0.01-5% crosslinking agent.

In one preferred embodiment, cross-linked methyl methacrylate particles are used. These comprise greater than 50 weight percent, preferably greater than 70 weight percent, and more preferably greater than 80 weight percent methyl methacrylate units and 0.5 to 20 percent, preferably 1 to 10 percent, of a monomer possessing at least two C=C double bonds acting as crosslinking agent. This may for example be 1,4-butanediol di(meth)acrylate, ethylene glycol di(meth)acrylate, tetraethylene glycol di(meth)acrylate, propylene glycol di(meth)acrylate, pentaerythritol tetra(meth)acrylate, allyl methacrylate or divinylbenzene. In another embodiment, acrylic copolymers containing a majority of butyl acrylate are used.

In another embodiment, the particles have a core-shell structure with rubbery alkyl acrylate polymers in the core and at least one polymer shell, which is compatible to the polymer matrix. This outer shell represents only a fraction of the total particle weight. The rubbery core typically comprises an alkyl acrylate polymer having a refractive index that differs by at least 0.02 or more units from that of the matrix polymer.

The particles can be of any shape. Particles formed from suspension or emulsion synthesis are relatively spherical. Particles formed from the grinding of cast sheet will be irregular. In one embodiment particles are formed from the grinding of cast sheet and have irregular shapes. The irregular shape can aid in light dispersion.

In one embodiment, it was surprisingly found that when a portion of the larger beads (30 to 80 microns, preferably from 40 to 70 microns, and more preferably 50-65 microns) is combined with a portion of smaller beads (2-20 microns, preferably 3 to 15 microns and more preferably 5 to 10 microns), a synergism occurred where the hiding power increased significantly without a noticeable change in the light transmission.

The diffusing particles maintain their shape and resist deformation under normal processing conditions of heat and pressure during incorporation into the polymer matrix and subsequent formation into articles. The particles can either be high Tg polymers, such as fluoropolymers or polyamides, or may be crosslinked polymer beads.

Light Source

The diffusing glazing of the invention is designed to diffuse and transmit a broad spectrum of light, including blue and red light, UVA light, visible light and far red light—all of which are needed for proper plant growth. Useful light sources including but not limited to LED light, incandescent light, and sunlight—or a mixture of these Blending Procedure:

The glazing of the invention may be blended and formed by any process known in the art for forming a glazing, including but not limited to melt compounding and melt processing, such as extrusion of blow molding, injection molding, or in a cast sheet polymerization process.

The glazing of the invention is at least 200 micrometers in thickness, with no limitation on the maximum thickness—other than the increase in cost and weight. A preferred thickness is from 250 microns to 10 mm, and more preferably from 300 micrometers to 5 mm in thickness.

Coating

In one embodiment, the diffusing glazing of the invention may be coated, to provide added properties to the glazing, such as dirt shedding and weathering. Useful dirt shedding coatings may include fluoropolymers, including polyvinylidene fluoride polymers and copolymers having at least 60 weight percent of polyvinylidene fluoride monomer units; silicon coatings, cross-linked acrylic coatings, and other coating known in the art for improving dirt shedding and weathering properties. The coating should not generally interfere with the transmission of UVA light. The coating may be added by a coating process, a coextrusion process, a lamination process, or other processes known in the art.

Properties:

The key properties of the glazing of the invention are that it allows a high level of light transmission over a broad light spectrum, including UVB light at 300 nm, UVA light at 350 nm, 465 nm, 665 nm and 800 nm. The glazing allows at least 30%, preferably at least 40%, more preferably at least 50%, more preferably at least 60%, more preferably at least 70% and most preferably at least 80% transmission of radiation at each of 300 nm, 350 nm, 465 nm, 665 nm and 800 nm light. While the glazing is effective for enhanced plant growth even without light diffusion, a preferred embodiment of the invention also includes a glazing that diffuses light-either due to surface treatment of the glazing, or due to the presence of diffusing particles. The glazing preferably diffuses light, providing at least 50%, preferably at least 60%, more preferably at least 70% and most preferably at least 80% hiding power—as measured by the test provided in this application, at the 350 nm, 465 nm, 665 nm, and 800 nm wavelength light.

Uses:

The light diffusing glazing material of the invention is useful for horticultural lighting applications, with the transmission and diffusing characteristics described previously.

The glazing could be used in conjunction with an LED light engine, in a greenhouse, with or without vertical farming techniques.

The light diffusing glazing could also be part of a multilayer glazing, having at least one layer with the diffusing composition of the invention.

Hiding Power

The hiding power of the LED glazing of the invention can be determined by a test comprising the steps of:

a) forming plaque of the material to be tested at uniform thickness—for example 2 mm thickness;

b) measuring the optical transmission of the sample on a Perkin Elmer Lambda 950 at 0 inches from the integrating sphere, and 350 nm, 465 nm, 665 nm, and 800 nm light;

c) measuring the optical transmission of the sample on a Perkin Elmer Lambda 950 at 2 inches from the integrating sphere, and 350 nm, 465 nm, 665 nm, and 800 nm light;

d) calculating the percent hiding power as a percentage, as the difference between the two transmission measurements (0 inch and 2 inch), divided by the 0 inch transmission measurement, times 100 to obtain a percent hiding power each of 350 nm, 465 nm, 665 nm, and 800 nm light.

Hiding power is somewhat related to haze, yet for many samples haze does not correlate well to hiding power. In general, the lighting industry relies on qualitative tests that vary from manufacturer to manufacturer, such as by ASTM 1003. In a commercial extruded lens or cover (2 mm thickness) the hiding power should be greater than 40% and preferably 50%, and not more than 95%. Below 30% light is not efficiently diffused at a reasonable distance (2 inch). Above 95% and the percent transmission of the lens is compromised, lowering the light output. In the thinner lens 0.9 mm (injection molded) the hiding power should also be greater than 40%

TABLE 1

| Sample # | Diffusion bead(s) | Additives |
|---|---|---|
| A1 | 0.6% Particle 1/4.5% Particle 2 | None |
| A2 | 0.6% Particle 3/4.5% Particle 2 | None |
| A3 | 18% Particle 2 | None |
| A4 | 0.6% Particle 1 | None |
| A5 | 0.6% Particle 3 | None |
| A6 | 0.6% Particle 3 | 0.05% TINUVIN 770 |
| A7 | 0.6% Particle 3 | 0.1% TINUVIN 770 |
| AB | 0.6% Particle 3 | 0.05% TINUVIN 770 0.03% IRGANOX 1076 |
| B1 (comp) | 0.6% Particle 3 | 0.01 TINUVIN-P |

TABLE 2

| Sample | % T 350 nm | % T 400 nm | % T 465 nm | % T 665 nm | % T 800 nm | HP 350 nm | HP 400 nm | HP 465 nm | HP 665 nm | HP 800 nm |
|---|---|---|---|---|---|---|---|---|---|---|
| A1 | 56.2 | 59.6 | 61.4 | 65.2 | 67.1 | 94.0% | 93.8% | 93.5% | 92.5% | 91.5% |
| A2 | 69.1 | 71.6 | 73.0 | 76.2 | 77.3 | 92.9% | 92.6% | 92.1% | 90.8% | 89.8% |
| A3 | 74.7 | 82.2 | 85.2 | 88.7 | 89.5 | 90.4% | 88.1% | 85.5% | 80.1% | 77.5% |
| A4 | 68.6 | 69.5 | 70.5 | 73.5 | 75.0 | 92.9% | 92.5% | 92.0% | 90.4% | 88.8% |
| A5 | 74.7 | 74.9 | 75.6 | 77.9 | 79.0 | 92.3% | 92.0% | 91.5% | 90.0% | 88.8% |
| A6 | 66.2 | 71.8 | 74.2 | 77.4 | 78.7 | 91.8% | 91.5% | 91.0% | 89.4% | 88.1% |
| A7 | 60.9 | 70.1 | 77.6 | 75.8 | 77.1 | 92.2% | 91.9% | 91.5% | 90.1% | 88.9% |
| A8 | 58.5 | 72.2 | 74.5 | 77.6 | 78.8 | 91.8% | 91.4% | 91.0% | 89.4% | 88.0% |
| B1 | 3.4 | 74.4 | 76.3 | 78.9 | 80.1 | 89.5% | 91.1% | 90.5% | 88.8% | 87.3% |

It has been found that the transmission curves are a function of the distance from the integrating sphere on a Perkin Elmer Lambda 950. Yet the change in the light transmission as a result of the distance from the integrating sphere is not constant for different materials. Calculation of hiding power is found to be a function of distance from integrating sphere.

Test: First a 2 inch by 2 inch square, 2 mm in thickness is extruded for each composition. The sample is placed in a Perkin Elmer Lambda 950 at 0 inches from the integrating sphere, and the transmission at 350 nm, 465 nm, 665 nm, and 800 nm light is measured. The sample is then moved to 2 inches from the integrating sphere, and the transmission at 350 nm, 465 nm, 665 nm, and 800 nm light is again measured. The hiding power is then calculated as the difference between the two transmission measurements (0 inch and 2 inch), divided by the 0 inch transmission measurement, times 100 to obtain a percent hiding power.

Examples

All Example materials A-1 through A-8 and comparative example B-1 were fabricated as follows: Resin A, diffusing particles, and additives were mixed together according to the formulations in Table 1 (percent refers to formulation weight percent). The mixture was melt compounded via twin screw extrusion and then pelletized. Analysis plaques were prepared by injection molding 2"×3"×0.125" sample chips. Analysis was performed on a Lambda 950 UV/VIS Spectrophotometer. Light transmission (% T) and Hiding Performance (HP) were calculated according to methods described above.

Resin A is Poly(Methyl-Methacrylate), MFI 2.3 g/10 min (ASTM D1238, 230° C./3.8 kg). The diffusing particle characteristics are summarized in Table 3. All percents in Table 1 refer to formulation weight percent.

TABLE 3

| Particle ID | Composition | Number Average Diameter (μm) | Refractive Index |
|---|---|---|---|
| Particle 1 | Silicone A | 2 | 1.39 |
| Particle 2 | MMA/Styrene Crosslinked | 50 | 1.51 |
| Particle 3 | Silicone B | 2.2 | 1.42 |

KEY CONCLUSIONS

Examples A-1 through A-5 achieve Hiding Performance (HP)>25% and % Light Transmission (% T)>30% at each of 350, 400, 465, 665, and 800 nm light. These samples do not contain additives that absorb UV-Light.

Examples A-6 through A-8 achieve Hiding Performance (HP)>25% and % Light Transmission (% T)>30% at each of 350, 400, 465, 665, and 800 nm light. These samples contain additives that do not absorb UV-A Light, but do absorb UV-B Light.

Comparative Example B-1 does not achieve % T>30% at 350 nm light. This sample contains an additive that absorbs UV-A and UV-B light.

What is claimed is:

1. A unit for horticultural production, comprising at least one sheet of a diffusing composition and at least one LED light engine,
   wherein the diffusing sheet or film is positioned between the LED light engine and at least one plant and has a hiding power of ±30 across the spectrum 300 nm-1000 nm,
   wherein the diffusing composition comprises a transparent or translucent polymer matrix, transmits at least 30 percent of UVB light at 300 nm, and transmits at least 50% of the UVA light at each of 350 nm 465 nm, 665 nm and 800 nm, and wherein the diffusing composition has a level of diffusion, as measured by hiding power, of at least 25 percent.

2. The unit of claim 1, wherein the diffusing composition is in the form of a glazing sheet or a glazing film.

3. The unit of claim 1, wherein the polymer matrix is a thermoplastic selected from the group consisting of polycarbonate (PC), polyethylene terephthalate, glycol modified (PETG), polyvinyl chloride (PVC), impact modified PVC, polyesters, styrene acrylonitrile (SAN), acrylonitrile-acrylate copolymer, acrylonitrile-methyl methacrylate copolymer, methyl methacrylate-styrene copolymer, methacrylate-butadiene-styrene terpolymer, acrylonitrile-styrene-acrylate (ASA) terpolymer, acrylonitrile butadiene styrene (ABS) terpolymer, polystyrene (PS), high impact polystyrene (HIPS), polyolefins, impact modified polyolefins, polycyclo-hexylethylene, cyclic olefin copolymer (COC), polyvinylidene fluoride (PVdF), PVdF-acrylic copolymers, imidized acrylic polymer, acrylic polymers, impact modified acrylic polymers, and mixtures thereof.

4. The unit of claim 3, wherein the polymer matrix is a polymethylmethacrylate (PMMA) homopolymer, or a PMMA copolymer comprising at least 50 weight percent of methyl methacrylate monomer units.

5. The unit of claim 1, wherein the polymer matrix is a thermosetting polymer selected from the group consisting of silicones and epoxides.

6. The unit of claim 1, wherein the diffusing composition further comprises impact modifiers and UVB and/or UVC absorbers.

7. The unit of claim 1, wherein the diffusing composition further comprises from 0.1 to 40 weight percent of diffusing particles dispersed in the polymer matrix.

8. The unit of claim 7, wherein the diffusing particles are organic, inorganic, or a mixture thereof.

9. The unit of claim 7, wherein the dispersing particles are inorganic, organic or a mixture thereof; have a spherical, near spherical or irregular shape; and have a refractive index mis-match with the polymer matrix of +/−0.01 to 0.25.

10. The unit of claim 7, wherein the diffusing particles have an average particle size of from 500 nm to 120 micrometers.

11. The unit of claim 7, wherein the dispersing particles comprise at least two different populations of number average particle sizes.

12. The unit of claim 6, wherein the impact modifiers have a core/shell morphology, where the core comprises a polysiloxane.

13. The unit of claim 1, where the diffusion is caused by a multi-modal distribution of diffusion particle sizes, a textured surface, or both.

14. The unit of claim 1, wherein a coated diffusing glazing comprises a sheet or film comprising the diffusing composition, and wherein the sheet or film further comprises a coating layer on at least one side.

15. The unit of claim 14, wherein the coating layer is a film layer.

16. The unit of claim 14, wherein the coating layer is a diffusing layer.

17. The unit of claim 14, wherein the coating layer is a dirt-shedding or weather resistant layer.

* * * * *